US009275228B2

(12) United States Patent
Niemela et al.

(10) Patent No.: US 9,275,228 B2
(45) Date of Patent: Mar. 1, 2016

(54) PROTECTING MULTI-FACTOR AUTHENTICATION

(71) Applicant: F-Secure Corporation, Helsinki (FI)

(72) Inventors: Jarno Niemela, Kirkkonummi (FI); Veli-Jussi Kesti, Espoo (FI)

(73) Assignee: F-Secure Corporation, Helsinki (FI)

(*) Notice: Subject to any disclaimer, the term of this patent is extended or adjusted under 35 U.S.C. 154(b) by 0 days.

(21) Appl. No.: 14/184,845

(22) Filed: Feb. 20, 2014

(65) Prior Publication Data

US 2014/0237591 A1   Aug. 21, 2014
US 2015/0178499 A2   Jun. 25, 2015

(30) Foreign Application Priority Data

Feb. 20, 2013 (GB) ................................. 1302992.1

(51) Int. Cl.
G06F 9/00 (2006.01)
G06F 21/57 (2013.01)
H04L 29/06 (2006.01)

(52) U.S. Cl.
CPC ............ G06F 21/57 (2013.01); H04L 63/0853 (2013.01); H04L 2463/082 (2013.01)

(58) Field of Classification Search
None
See application file for complete search history.

(56) References Cited

U.S. PATENT DOCUMENTS

| 6,233,685 | B1* | 5/2001 | Smith ................... G06F 21/33 713/185 |
| 7,721,336 | B1* | 5/2010 | Adjaoute .............. G06Q 20/04 379/145 |
| 8,359,657 | B2* | 1/2013 | Mykland ................ G06F 21/10 713/189 |
| 8,739,278 | B2* | 5/2014 | Varghese ........................ 726/22 |
| 8,768,838 | B1* | 7/2014 | Hoffman ................ G06Q 40/00 705/44 |
| 2005/0188222 | A1* | 8/2005 | Motsinger ............. G06F 21/316 726/5 |
| 2005/0273442 | A1 | 12/2005 | Bennett et al. |
| 2007/0136573 | A1 | 6/2007 | Steinberg |
| 2007/0220595 | A1 | 9/2007 | M'Raihi et al. |
| 2007/0250916 | A1* | 10/2007 | Shull ....................... H04L 63/08 726/5 |
| 2008/0002882 | A1* | 1/2008 | Voloshynovskyy .. G07D 7/0046 382/181 |
| 2008/0275748 | A1* | 11/2008 | John ..................... G06Q 30/06 705/35 |

(Continued)

OTHER PUBLICATIONS

Edge, Kenneth; Raines, Richard; Bennington, Robert; Reuter, Christopher. The Use of Attack and Protection Trees to Analyze Security for an Online Banking System. 40th Anual Hawaii International Conference on System Sciences, 2007. HICSS 2007. http://ieeexplore.ieee.org/stamp/stamp.jsp?tp=&arnumber=4076665.*

(Continued)

Primary Examiner — Jeremiah Avery
(74) Attorney, Agent, or Firm — Harrington & Smith

(57) ABSTRACT

Methods are detailed for online fraud prevention. In one approach state information of a first and a second device is monitored, both of which are associated with one user. During a multi-factor authentication procedure which utilizes at least one of the first and the second devices for authorizing a transaction by an Internet domain, a security server participates in a supplemental security procedure which is conditional on the monitored state information. In another approach the second device receives a message that is ostensibly related to multi-factor authorization by an Internet domain, and in response sends a query about state information of the first device. Based on the response to the query that indicates the state information, the second device performs a supplemental security procedure.

12 Claims, 3 Drawing Sheets

(56) References Cited

U.S. PATENT DOCUMENTS

| | | | |
|---|---|---|---|
| 2009/0037983 A1* | 2/2009 | Chiruvolu et al. | 726/4 |
| 2009/0165132 A1* | 6/2009 | Jain | G06F 21/51 |
| | | | 726/22 |
| 2009/0183254 A1* | 7/2009 | Franco | G06F 21/34 |
| | | | 726/17 |
| 2009/0222891 A1 | 9/2009 | Heffez | |
| 2010/0064341 A1* | 3/2010 | Aldera | H04L 63/102 |
| | | | 726/1 |
| 2013/0073853 A1* | 3/2013 | Ford | H04L 63/1466 |
| | | | 713/168 |

OTHER PUBLICATIONS

San Martino, Antonio; Perramon, Xavier. A Model for Securing E-Banking Authentication Process. IEEE Congress on Services—Part I, 2008. Relevant pp. 251-254. http://ieeexplore.ieee.org/stamp/stamp.jsp?tp=&arnumber=4578332.*

Mohammed, Mahmoud Musa; Elsadig, Dr. Muna. A Mulit-layer of Multi Factors Authentication Model for Online Banking Services. 2013 International Conference on Computing, Electrical and Electronics Engineering (ICCEEE). Relevant pp. 220-224. http://ieeexplore.ieee.org/stamp/stamp.jsp?tp=&arnumber=6633936.*

* cited by examiner

102: monitor state information of a first and a second device, both of which are associated with one user 104: during a multi-factor authentication procedure which utilizes at least one of the first and the second devices for authorizing a transaction by an Internet domain, participate in a supplemental security procedure, in which the supplemental security procedure is conditional on the monitored state information 106: the supplemental security procedure comprises;
for the case in which the state information of the first device indicates that the user has recently entered identifying user information at the Internet domain via the first device, checking authenticity of an application on the second device 108: the supplemental security procedure comprises;
for the case in which the authenticity of the application on the second device cannot be verified, signaling the second device that state information for the first device has recently changed

Figure 1

PROTECTING MULTI-FACTOR AUTHENTICATION

TECHNICAL FIELD

The exemplary and non-limiting embodiments of this invention relate generally to security systems, methods, devices and computer programs, and more specifically relate to authorizing user transactions via a multi-factor authentication that relies on one or more devices such as personal computers (PCs) and/or mobile devices that are associated with the user.

BACKGROUND

Two-factor authentication (TFA) is commonly used to authenticate transactions done via electronic computers. Basic authentication is the process of a requesting entity presenting some evidence of its identity to a second entity. Two-factor authentication decrease the probability that the requestor is presenting false evidence of its identity by requiring two different types of evidence, or factors, from among a finite list of pre-approved factors. Traditional two-factor authentication requires the requester to present two of three possible factors: something the user knows (such as personal identification number PIN or password); something the user has (such as an automated teller machine ATM card or a registered mobile phone); and something the user is (such as a fingerprint or retina image).

Consider a common example of two-factor authentication. A bank customer visits an ATM hosted by a bank at which he does not hold an account and presents his physical ATM card (something the user has, a possession factor) and thereafter enters his PIN at the keypad (something the user knows, a knowledge factor). To dispense cash the ATM requires both of these factors to match the user's records at the user's own bank, and absent that the two-factor authentication will fail.

Two-factor authentication is common but a given multi-factor authentication procedure can require more than two different factors before allowing a transaction to proceed. The number of factors considered in the authentication is important because it implies (but does not guarantee) a higher probability that the bearer of the identity evidence in the computer/virtual realm indeed holds that identity in real life.

One category of TFA tools transforms the mobile phone of the personal computer (PC) user into a token device, commonly using a short messaging service (SMS) message exchange or an interactive telephone call or some other exchange enabled by an application that is downloaded to the user's smartphone. If the user enters his/her personal identifying information at the PC (knowledge factor), the user's mobile phone can serve as the possession factor of the two-factor authentication, so long as there is a message exchange and the user's mobile phone is pre-registered with the Internet domain on which the transaction is taking place.

Banking and other financial entities utilize two-factor (or more generically multi-factor) authentication commonly now that Internet-based banking has become ubiquitous. But online banking transactions are subject to attack by criminals using malware, of which several types have been identified that attack the PC and/or the mobile device.

Any authentication process which utilizes an insecure out-of-band method such as an email data link or a phone voice or data link, or which fails to provide mutual-authentication, is inherently vulnerable to a man-in-the-middle (MIM) attack. In a MIM attack, the fraudster is actually interacting with the legitimate website and the victim is interacting with the fraudster's counterfeit website. A victim who is lured to a fraudulent website then triggers the attack by entering his/her normal login credentials at the counterfeit website which appears legitimate. The counterfeit website then transmits these stolen credentials to the legitimate website using scripts or other protocols and for example the legitimate website then initiates a telephone call to the victim as part of its two-factor authentication. Believing the website to be legitimate, the victim uses his own mobile phone to complete the authentication, not realizing that doing so permits the fraudster to complete entry into the victim's account on that occasion.

Adding an additional biometric factor to the authentication is possible but is an expensive option; at least in the short term is not a practical solution to counter this growing malware threat by installing a finger imaging reader or retina scanner at every ATM along with the underlying databases needed to render them effective. What is needed in the art is a way to diminish these opportunities for malware to hijack a multi-factor authentication procedure without requiring vast upgrades to existing infrastructure.

SUMMARY

In a first exemplary aspect of the invention there is a method for online fraud prevention. The method comprises: monitoring state information of a first and a second device, both of which are associated with a single user, the state information indicating whether or not the device associated with the state information has been active on an Internet domain; and during a multi-factor authentication procedure which utilizes one of the first and the second devices for authorizing a transaction by the Internet domain, participating in a supplemental security procedure, the supplemental security procedure conditional on the monitored state information of the other of the first and the second devices.

In a second exemplary aspect of the invention there is an apparatus comprising a processing system, and the processing system comprises at least one processor and a memory storing a set of computer instructions. The processing system is configured to cause the apparatus to at least: monitor state information of a first and a second device, both of which are associated with a single user, the state information indicating whether or not the device associated with the state information has been active on an Internet domain; and during a multi-factor authentication procedure which utilizes one of the first and the second devices for authorizing a transaction by the Internet domain, participate in a supplemental security procedure, the supplemental security procedure conditional on the monitored state information of the other of the first and the second devices.

In a third exemplary aspect of the invention there is a computer readable memory tangibly storing a set of computer executable instructions for online fraud prevention. In this exemplary aspect the set of computer executable instructions comprise code for monitoring state information of a first and a second device, both of which are associated with a single user; and code, for execution during a multi-factor authentication procedure which utilizes at least one of the first and the second devices for authorizing a transaction by an Internet domain, for participating in a supplemental security procedure, the supplemental security procedure conditional on the monitored state information.

In a fourth exemplary aspect of the invention there is a method for online fraud prevention. The method comprises: receiving a message at a second device associated with a single user, the message ostensibly related to multi-factor authorization by an Internet domain; in response to receiving the message, sending a query about state information of a first device associated with the user; and based on the response to the query that indicates the state information, performing a supplemental security procedure to the second device.

In a fifth exemplary aspect of the invention there is an apparatus comprising a processing system which comprises at least one processor and a memory storing a set of computer instructions. The processing system is configured to cause the apparatus to at least: receive a message at a second device associated with a user, the message ostensibly related to multi-factor authorization by an Internet domain; in response to receiving the message, send a query about state information of a first device associated with the user; and based on the response to the query that indicates the state information, perform a supplemental security procedure.

In a sixth exemplary aspect of the invention there is a computer readable memory tangibly storing a set of computer executable instructions for online fraud prevention. In this exemplary aspect the set of computer executable instructions comprise code for receiving a message at a second device associated with a user, the message ostensibly related to multi-factor authorization by an Internet domain; code for sending a query about state information of a first device associated with the user in response to receiving the message; and code for performing a supplemental security procedure based on the response to the query that indicates the state information.

These and other aspects are detailed below with more particularity.

BRIEF DESCRIPTION OF THE DRAWINGS

FIG. 1 is a logic flow diagram that illustrates a method, and a result of execution by an apparatus of a set of computer program instructions embodied on a computer readable memory for preventing online fraud, in accordance with certain exemplary embodiments of these teachings.

DETAILED DESCRIPTION

Figure 2:
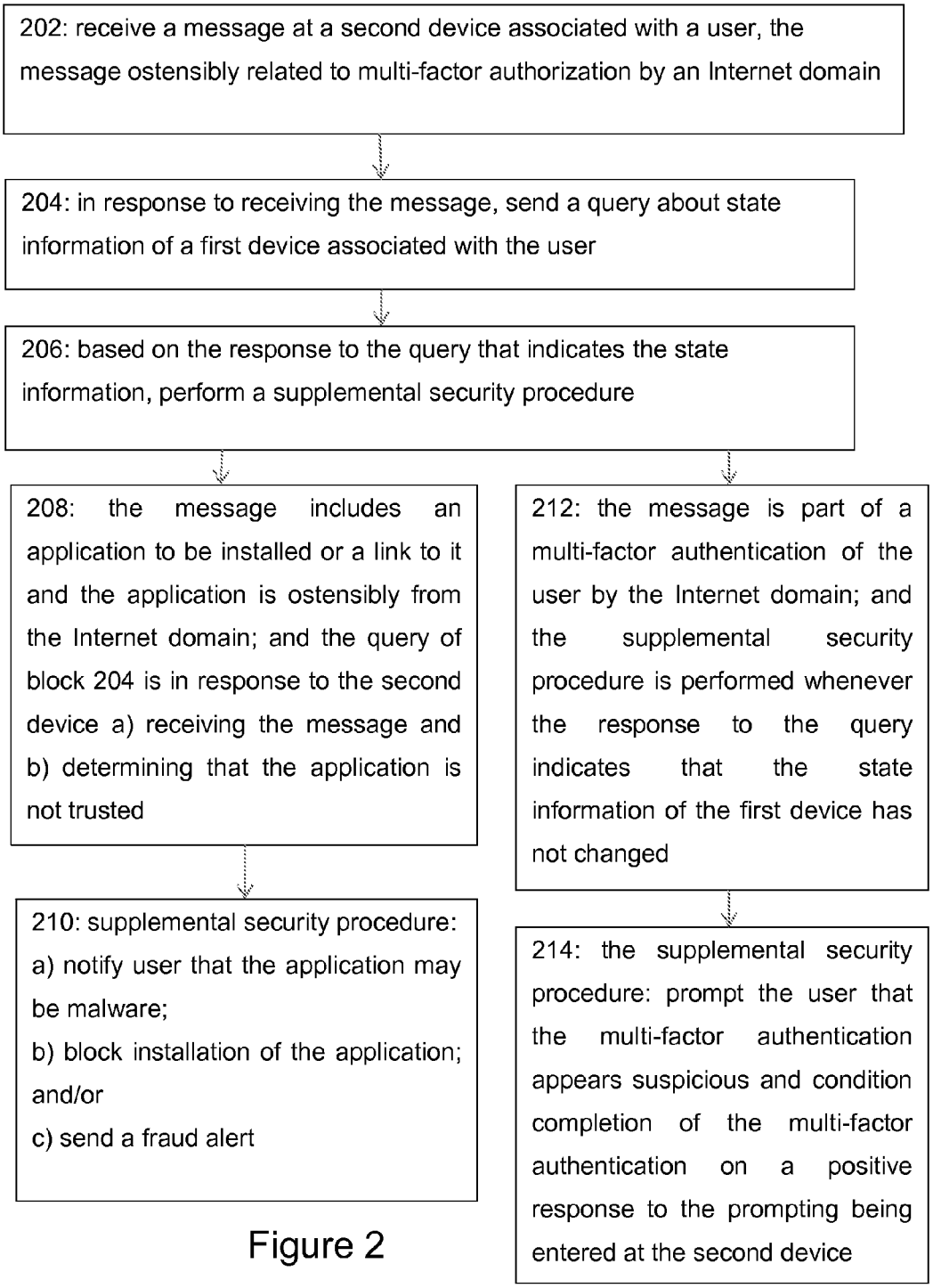
FIG. 2 is another logic flow diagram that illustrates a method, and a result of execution by an apparatus of a set of computer program instructions embodied on a computer readable memory for preventing online fraud, in accordance with certain exemplary embodiments of these teachings.

According to exemplary embodiments of these teachings, protection of two-factor authentication relies on monitoring state information of both the mobile device and the PC associated with a given user (or whatever two devices are associated with the user in the two-factor authentication database) in a manner that can indicate that two-factor authentication is being attacked. The state information informs whether or not, within a backward-looking time interval, the user device associated with that state information has been active on the banking website/domain, such as by entering login data or identifying information of the user. Once the time interval expires the state information reflects that this particular device has not been active on the banking website/domain. In one embodiment this state information can be checked to determine if the authentication is suspicious, and when it is the user can then be warned and either proceed with the authentication if legitimate or not proceed if it is not. In another embodiment the state information can be used to check whether an application not yet loaded on the user's other device is suspicious, and prevent loading of that malware.

In this manner there is a supplemental security procedure in addition to the normal two-factor authentication which operates to protect that authentication, or to protect malware from being loaded which could compromise some future two-factor authentication. One important aspect of these teachings is that the state information of one device (e.g., the PC) is used to strengthen the heuristic analysis on another device (e.g., the mobile phone). Specifically, activity that may not be suspicious when examined only within the context of one of the user devices is revealed to be suspicious when the normal two-factor authentication process is subject to this wider context of checking state information of the other device. The decision to approve or disapprove the transaction is still subject to the two-factor authentication, but before that normal authentication is complete the supplemental security procedure intervenes to help prevent malware from being successful in executing a bogus transaction. And when the attacker attempts to load malware to hijack some future two-factor authentication the wider context information of these teachings can be used to prevent that too.

The examples below assume two-factor authentication but these teachings are readily applicable to three or more -factor authentication, which along with two-factor are more generically referred to as multi-factor authentication. And while the examples herein assume a user's PC and mobile phone as respective first and second devices associated with that user in an authentication database that is kept and accessed by the Internet domain of the banking or other financial entity (and also by the security backend if that backend is operated by other than the banking entity as detailed below), these also are non-limiting embodiments and the user devices can be a tablet computer, an automobile with in-built two-way communication capability with the Internet domain, a home phone/landline, or any number of other types of devices that can be electronically identified and associated with a given user. In the examples below, banking website is also used in a non-limiting manner; these teachings can be used for any Internet domain that uses multi-factor authentication to approve transactions.

Finally, the term security backend may refer to one or more servers associated with the banking website, or it may be one or more servers associated with a standalone security service separate from the banking website which may in an embodiment learn the state information from client applications it provides for the user to install on his/her devices. In this manner the backend features of these teachings may be practiced by the banking entity itself or by some other security service that operates independent of the banking entity, even without the banking entity's active cooperation.

One exemplary embodiment of these teachings includes detecting an attempt to infect a user's mobile device with a banking Trojan program. A typical mobile banking infection scenario starts when a user's PC is infected and the attacker is using HTML injection to fool the user to install malware on his or her mobile device.

One typical pattern of this type of infection is as follows:
A. the user's PC is infected with malware or a type of Trojan;
B. the malware injects a banking page with a fake notice that the bank has a new security mechanism that requires software to be installed to the user's mobile phone;
C. the malware injects a banking page with additional content that asks for the user's mobile device model and phone number, email or other identifying information;

D. the user will receive an SMS message or an email containing a link to an application that the malware author wants to be installed on the mobile device;

E. the user installs the malware on the mobile device; and

F. the bank two-factor authentication can now be attacked.

The above banking Trojan infection pattern can be broken according to these teachings by keeping track of the user's inputs to the banking Internet domain via the PC, and notifying the security backend (for example, authentication and authorization servers of the banking entity or of a separate security service) whenever a user enters personal identifying information into a banking web page. The type of information is less important that the fact that the user has recently entered personal identifying information at the banking site, for example an email address or phone number or login ID with password. This is state information for the device which the user used to enter it. This state information is kept in the security backend for a period of time, for example 30 minutes, and if there is no new entry of user information to re-start that time interval after the 30 minutes the state information for that device updates to reflect that the user has not been active on the banking website with that device. As will be detailed in the examples below, the state information of a single user device can be queried by the user's other devices.

Accordingly, when a user receives an application installation link on his or her mobile device at a time not associated with the user's activity on the banking website, the state information whether the user has just entered his or her identifying information to a bank website using another device and the fact that the user received an unknown application link or application installer can be used to help determine whether the application is suspicious.

Now consider the above banking Trojan example when the two-factor authentication is protected by an embodiment of these teachings which consult state information of the other user device. Assume that a user visits a bank website, during which banking protection through the website begins normally. According to part B above, a malware program then injects social engineering content (malware) into the bank website, in what is known as a browser-in-the-middle (BIM) attack. The user enters his or her mobile number, email or other information into the infected bank website per part C above. An embodiment of these teachings provides a client software program on the user's PC, which notifies the security backend that the user has just submitted his/her identifying information. This sets the state information for the user's PC to active.

The user then receives a social engineering/malware SMS message at his or her mobile device as in part D above. The mobile device notices that the user received an application link or installer that is unknown to the security backend servers. The mobile device checks the authenticity of the application by checking whether the application is signed with the bank's certificate, or whether it is a well-known banking application. If the mobile device is not able to confirm by the above checks that the application is trusted, the mobile device queries the security backend asking whether the user has entered personal identifying information. The backend checks the state information and sees that the user's PC was active recently, and so it answers yes. Using this state information of the first device/PC, the user's second device/mobile phone alerts him/her that the unknown application is suspicious, and/or the mobile phone blocks installation of that suspicious application. In one exemplary embodiment the mobile device additionally reports back to the security backend that the application appears to be a banking Trojan attempt. The backend aggregates such reports from multiple users (and possibly also from multiple bank's if the security backend is a separate security service from the individual banking website itself), and if it gets enough alarms it will block the application and alert analysts (and optionally the bank in question where an external security service is performing the supplemental authentication). The backend then sends a request to the mobile device to upload the suspicious application where it can be analyzed in detail. Optionally the mobile device can also send a fraud alert to the bank website (if the backend is a stand-alone security service) so that they can switch on fraud monitoring for the user's account.

After an attacker has been able to inject a user's mobile device with malware, the attacker will often wait until late at night in the user's country, or some other time when the user is unlikely to be monitoring his or her phone. When this time arrives the attacker may then connect to the banking website using his own PC, or some other PC that is not the victim's PC, to transfer money from the victim's account. The attacker will use the banking Trojan or malware in the mobile device to authenticate the transaction. An exemplary embodiment of this invention identifies and breaks this pattern by monitoring the state in both the user's PC and the mobile device. This allows either device to inform the backend whenever a user's PC is in safe banking mode.

A non-limiting exemplary embodiment comprises guarding a two factor authentication process when a user is not banking. If the mobile device finds out that it is being used in two factor authentication when the user's PC is not in banking mode, it can prevent the authentication from being successful. First, an attacker users his or her PC or some other PC than that of the victim (whose PC is likely at that time to be off or in sleep mode) and logs into the bank and initiates a money transfer. The bank server will then initiate a two-factor authentication by sending a request to the user's mobile device via an SMS message or by showing a code on the website that the user then enters into a standalone authentication application that is resident on the mobile device. The mobile device notices the authentication request (SMS or authentication application starting up) and asks the backend server whether the user is currently doing banking. The backend server notices that the state information for the user's PC indicates he/she has not been recently logged in to banking website. The backend server responds to the mobile device that the user is not doing banking at the moment. The mobile device will then prompt the user, asking whether the two-factor authentication should be accepted since it looks suspicious. This prompt could require the user to enter a PIN code or simply make some positive approval for the authentication via the SMS to proceed. If the user does not approve the authorization, in this embodiment the mobile device will abort the two-factor authentication and terminate any unknown applications that have access to two-factor authentication capabilities, for example SMS messages. The mobile device thereby prevents that authentication application from starting and/or prevents SMS messages being sent back to the bank to complete authorization of any transaction. In an embodiment the mobile device will inform the security backend that a transaction authorization was aborted, and send the security backend forensic data about the unknown application such as for example processes, network connection(s), SMS messages, and so forth to enable a more detailed analysis of the attack. Optionally the mobile device can also send a fraud alert to the banking website so that they can switch on fraud monitoring for the account, if the security backend is not in fact run by the banking website. In another embodiment, for example when the security backend is not a part of the banking entity itself, the security backend can send this fraud alert to the banking entity after the user's mobile device informs the security backend that the transaction was aborted.

FIG. 1 presents a summary of the above teachings for preventing online fraud. Specifically, FIG. 1 summarizes from the perspective of the security backend embodiments of these teachings in which for example there is a banking Trojan on the user's PC and when the user does some banking on the PC the user's mobile device gets a SMS or other message with a link to a malware application which is not trusted (it lacks a certificate from the bank or the application is not a well-recognized banking application). At block 102, state information is monitored of a first and a second device, both of which are associated with a user. Then at block 104, during a multi-factor authentication procedure which utilizes at least one of the first and the second devices for authorizing a transaction by an Internet domain (e.g., the banking website), the security backend for example participates in a supplemental security procedure, in which the supplemental security procedure is conditional on the monitored state information. That is, whether or not the supplemental security procedure is performed is conditional on the state information.

In the above examples the first device is a personal computer (PC) and the second device is a mobile device, and the method set forth at FIG. 1 may be executed by the security backend operated by a security service separate from the banking website. Such a security backend can be considered to be at least one computer server which monitors the state information via client software applications installed in the PC and in the mobile device.

Further portions of FIG. 1 summarize some of the optional/non-limiting details from the above example of how these teachings counter a banking Trojan. Block 106 tells that the supplemental security procedure comprises, for the case in which the state information of the first device indicates that the user has recently entered identifying user information at the Internet domain via the first device, checking authenticity of an application on the second device. As a further non-limiting detail of the embodiment of block 106, block 108 summarizes that for the case in which the authenticity of the application on the second device cannot be verified then the supplemental security procedure also includes signaling the second device that state information for the first device has recently changed. In this manner the state information of one device is used as a wider context of information to protect that portion of a two- or multi-factor authentication process that uses the second device (regardless of whether the second device is used for the possession factor or the knowledge factor in the traditional two-factor authorization process). Note that the supplemental security procedure is in addition to the multi-factor authorization process, not merely adding another authentication factor to it.

FIG. 2 presents a second exemplary summary of the above teachings for preventing online fraud. FIG. 2 recites from the perspective of the second device, which in the above examples is the user's mobile phone but that is but one non-limiting example of what might be the second device in FIG. 2. This relates to both the first example above in which the mobile device gets a link to a suspicious application that the mobile is supposed to load, and also to the second example above in which the banking site is entered using a PC or some other device which is not registered to the user; the banking site does not recognize it and so it is not in safe banking mode despite the fact that the attacker might have entered the user's login ID and password. In this case, if the PC associated with the user is considered as the first device then the state information for it will indicate there has been no change, since the user's account was accessed (possibly by an attacker) with an unrecognized device.

FIG. 2 begins at block 202 at which the second device (e.g., the mobile device in the above examples), which is associated with a single user at the banking site and also at the security backend, receives a message that is ostensibly related to multi-factor authorization by an Internet domain. In this context it is ostensibly related to multi-factor authorization because it may or may not be a legitimate message from the bank's Internet domain website and may not even be sent from the bank's true domain, but it appears to be legitimate from the user's perspective. The message need not be obviously related to two-factor authentication from the user's perspective since many users are not familiar with specifics of internet security protocols but to be ostensibly related it is enough that the user recognize the message as related to online security for his/her bank or other entity at which the user conducts online financial transactions.

Then at block 204, in response to receiving the message the second device sends a query about state information of a first device that is associated with the user. This query goes to the security backend, which may be at the bank or at a stand-alone security service. Finally, block 206 tells that based on the response to the query that indicates the state information, the second device performs a supplemental security procedure. As with FIG. 1, the state information is used in the decision whether or not to run the supplemental security procedure, not whether or not the supplemental security procedure is satisfied or otherwise complied with. Unlike the more detailed examples of FIG. 1, for FIG. 2 there are different implementations; in one the supplemental security procedure will be performed if there is a change to the state information of the first device (and not if there is no such change), and in another implementation it will be performed if there is no change to the state information of the first device (and it will be run if there is such change). Further portions of FIG. 2 summarize these different non-limiting implementations.

Blocks 208 and 210 summarize an embodiment from the banking Trojan example above. Specifically, at block 208 the message includes an application to be installed on the second device or a link to such an application, and this application is ostensibly from the Internet domain (e.g., the banking website). In this embodiment, the query of block 204 that the second device sends is in response to the second device receiving the message and further in response to the second device determining that the application is not trusted (e.g., no certificate from the banking website, or not a well-recognized banking application). Further non-limiting details of this implementation are at block 210, which specifies that for the case that the application is determined to be not trusted the supplemental security procedure comprises the second device performing at least one of:
  a) notifying the user that the application may be malware;
  b) blocking installation of the application on the second device; and
  c) sending a fraud alert about the application to the Internet domain.

Blocks 212 and 214 summarize an embodiment from the above example in which a PC that is not in bank-safe mode is used to begin a transaction on behalf of the user. Specifically, at block 212 the message is part of a multi-factor authentication of the user by the Internet domain; and the supplemental security procedure is performed whenever the response to the query indicates that the state information of the first device has not changed (the first device has been active on the Internet domain). A further non-limiting detail of the block 212 implementation is at block 214 which summarizes that the supplemental security procedure comprises the second device prompting the user that the multi-factor authentication appears suspicious and further comprises conditioning completion of the multi-factor authentication on a positive response to the prompting being entered at the second device, such as the user's PIN or simple approval at a user interface of the mobile device.

The specific elements of FIG. 1 and FIG. 2 may be considered as steps of a method according to these teachings, of specific logical code of a set of computer executable instructions that are stored in or on a computer readable memory, or actions taken or functions executed by an apparatus that has one or more processors to execute such computer code stored on a memory. Such an apparatus may be the entire server backend or second device as in the above examples, or one or more components of same which perform the functions shown at FIGS. 1-2 and detailed further in the above non-limiting examples.

Figure 3:
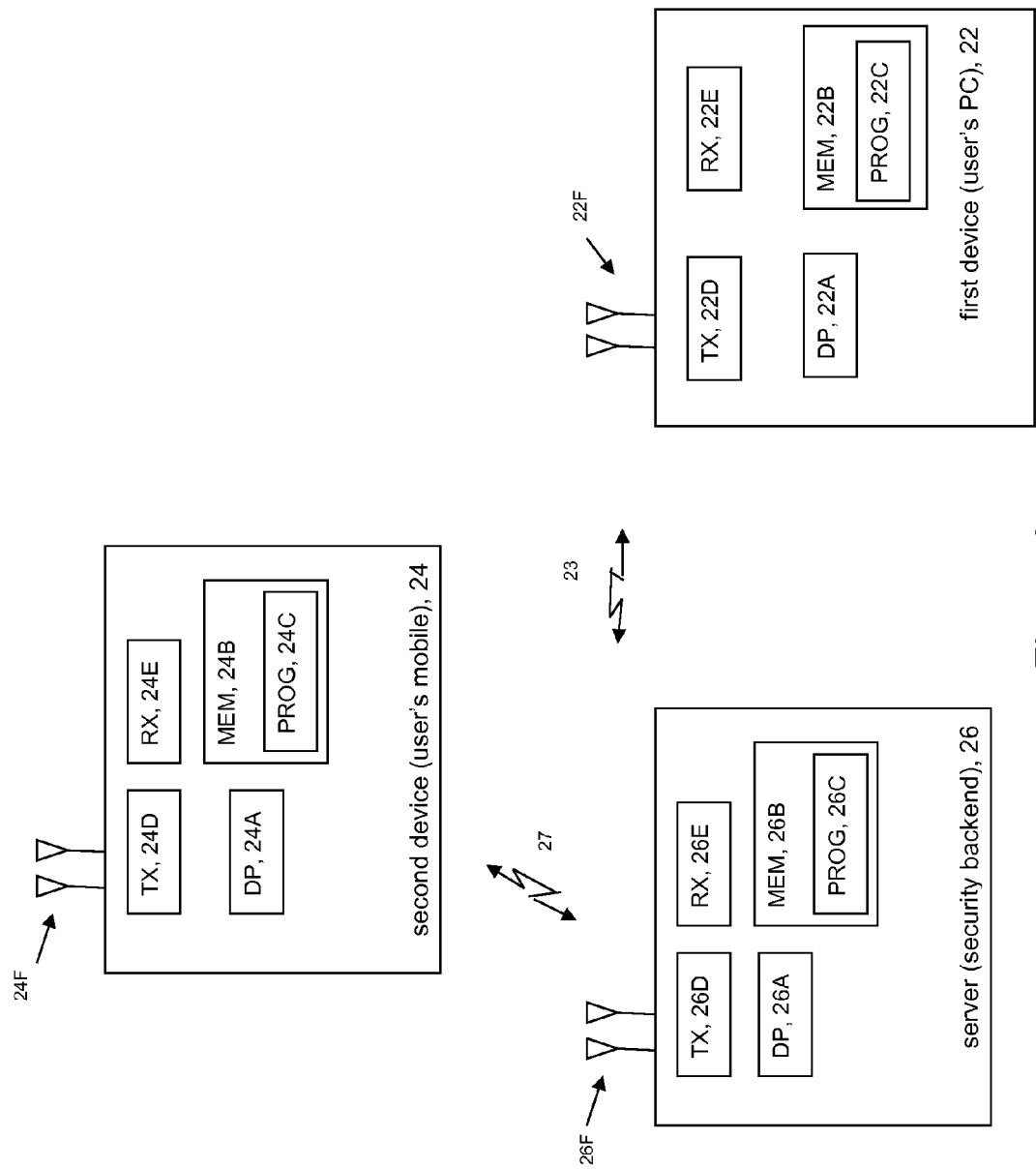
FIG. 3 is a simplified block diagram of multiple UE's, and a server which are exemplary electronic devices suitable for use in practicing the exemplary embodiments of these teachings.

Reference is now made to FIG. 3 for illustrating a simplified block diagram of various electronic devices and apparatus that are suitable for use in practicing the exemplary embodiments of this invention. In FIG. 3 there is a second device 24 representing the user's mobile device of the above examples that is adapted for communication over a wireless link 27 with an apparatus such as a server 26 which represents the security backend from the above examples. The second device 24 may be any electronic device such as a user equipment, mobile terminal, tablet, smartphone, etc. for communication over any of the various types of wireless networks that are available for Internet access. Communication between the backend server 26 and the second device 24 is typically not direct but through some radio access network or WLAN access point. Those entities are well known but not shown at FIG. 3 in order to leave the illustration clear to show relevant aspects of the involved devices.

The second device 24 includes processing means such as at least one data processor (DP) 24A, storing means such as at least one computer-readable memory (MEM) 24B storing at least one computer program (PROG) 24C, and communication means such as a transmitter TX 24D and a receiver RX 24E for bidirectional wireless communications with the server 26. All of these wireless communications are via one or more antennas 24F.

There is also shown at FIG. 3 the first device 22 which represents the user's PC from the above examples. This first device 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional communications over link 23 with the server 26 via one or more antennas 22F. Link 23 may be wired in which case the antennas 22F of the first device are superfluous, or wireless in which case they are not.

The server 26 represents one or more of them at the security backend from the above examples, and includes processing means such as at least one data processor (DP) 26A, storing means such as at least one computer-readable memory (MEM) 26B storing at least one computer program (PROG) 26C, and communication means such as a transmitter TX 26D and a receiver RX 26E for bidirectional communications with the second device 24 via one or more antennas 26F and with the first device 22. Wired or wireless electronic communications entail use of a modem at each of these devices 22, 24, 26 as is well known in the art, which may also be the communication means of any of these devices.

At least one of the PROGs 24C in the second device 24 is assumed to include a set of program instructions that, when executed by the associated DP 24A, enable the device to operate in accordance with the exemplary embodiments of this invention, as detailed above. The second device 24 also has software stored in its MEM 24B to implement certain aspects of these teachings. Further, the server 26 may also have implementing software to put into effect the teachings herein as detailed above. In these regards the exemplary embodiments of this invention may be implemented at least in part by computer software stored on the MEM 24B, 24B which is executable by the DP 24A of the second device 24 and/or by the DP 22A of the UE 22, and/or by the DP 26A of the server 26; or by hardware, or by a combination of tangibly stored software and hardware (and tangibly stored firmware) in any one or more of these devices 22, 24, and 26. Electronic devices implementing these aspects of the invention need not be the entire devices as depicted at FIG. 3 or may be one or more components of same such as the above described tangibly stored software, hardware, firmware and DP, or a system on a chip SOC or an application specific integrated circuit ASIC.

Various embodiments of the computer readable MEMs 22B, 24B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 22A, 24A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the WLAN systems, as noted above the exemplary embodiments of this invention are not limited for use with only this particular type of wireless radio access technology networks.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for online fraud prevention comprising:
monitoring state information of a first and a second device, both of which are associated with a single user, the state information indicating whether or not the device associated with the respective state information has been active on an Internet domain; and during a multi-factor authentication procedure which utilizes at least the second device for authorizing a transaction by the Internet domain, participating in a supplemental security procedure that comprises sending information about the monitored state information of the first device to the second device;
wherein for a case in which the sent information about the monitored state information of the first device indicates that the user has entered identifying user information at the Internet domain via the first device within a prescribed period of time, the supplemental security procedure comprises checking authenticity of an application on the second device or of an application for which there is an installation link on the second device.

2. The method according to claim 1, wherein:
for a case in which the authenticity of the application cannot be verified, the supplemental security procedure comprises signalling the second device that state information for the first device has changed within the prescribed period of time.

3. The method according to claim 2, wherein:
the first device is a personal computer (PC) and the second device is a mobile device.

4. The method according to claim 3, wherein the method is executed by at least one computer server which monitors the state information via a client software application installed in at least the mobile device.

5. An apparatus comprising a processing system, the processing system comprising at least one processor and a memory storing a set of computer instructions such that the processing system is configured to cause the apparatus at least to:
monitor state information of a first and a second device, both of which are associated with a single user, the respective state information indicating whether or not the device associated with the state information has been active on an Internet domain; and during a multi-factor authentication procedure which utilizes at least the second device for authorizing a transaction by the Internet domain, participate in a supplemental security procedure that comprises sending information about the monitored state information of the first device to the second device:
wherein for a case in which the sent information about the monitored state information of the first device indicates that the user has entered identifying user information at the Internet domain via the first device within a prescribed period of time, the supplemental security procedure comprises checking authenticity of an application on the second device or of an application for which there is an installation link on the second device.

6. The apparatus according to claim 5, wherein:
for a case in which the authenticity of the application cannot be verified, the supplemental security procedure comprises signalling the second device that state information for the first device has changed within the prescribed period of time.

7. The apparatus according to claim 6, wherein:
the first device is a personal computer (PC), the second device is a mobile device different from the PC, and the apparatus comprises at least one computer server which monitors the state information via a client software application installed in at least the mobile device.

8. A method for online fraud prevention comprising:
receiving a message at a second device associated with a single user, the message including an application to be installed on the second device or a link to such an application and the message is recognizable as being related to multi-factor authentication by an Internet domain and the application is recognizable as being from the Internet domain;
in response to the second device receiving the message and further determining that the application is not trusted, the second device sending a query about state information of a first device associated with the user, the state information identifying whether or not the first device has been active on an Internet domain; and based on a response to the query that indicates the state information of the first device, performing a supplemental security procedure to the second device.

9. The method according to claim 8, wherein for a case in which the second device determines that the application is not trusted, the supplemental security procedure comprises the second device performing at least one of:
notifying the user that the application may be malware;
blocking installation of the application on the second device; and
sending a fraud alert about the application to the Internet domain.

10. The method according to claim 8, wherein:
the message is part of a multi-factor authentication of the user by the Internet domain; and
the supplemental security procedure is performed whenever the response to the query indicates that the first device has been active on the Internet domain.

11. The method according to claim 10, wherein the supplemental security procedure comprises the second device prompting the user that the multi-factor authentication appears suspicious and further comprises conditioning completion of the multi-factor authentication on a positive response to the prompting being entered at the second device.

12. The method according to claim 8, wherein:
the first device is a personal computer (PC) and the second device is a mobile device which executes the method.

* * * * *